Oct. 28, 1969 D. H. COVILL 3,475,685

INTERROGATING APPARATUS FOR DETERMINING OPTIMUM FREQUENCY FOR RADIO COMMUNICATION

Filed June 14, 1965 3 Sheets-Sheet 1

United States Patent Office
3,475,685
Patented Oct. 28, 1969

3,475,685
INTERROGATING APPARATUS FOR DETERMINING OPTIMUM FREQUENCY FOR RADIO COMMUNICATION

Dennis H. Covill, Hacketts Cove, Nova Scotia, Canada, assignor to E.M.I.-Cossor Electronics Limited, Dartmouth, Nova Scotia, Canada, a company of Canada
Filed June 14, 1965, Ser. No. 463,688
Claims priority, application Great Britain, June 13, 1964, 24,633/64; Apr. 20, 1965, 16,673/65
Int. Cl. H04b *1/04*
U.S. Cl. 325—67 8 Claims

ABSTRACT OF THE DISCLOSURE

The invention relates to high frequency communication systems incorporating apparatus for determining the optimum carrier frequency. The apparatus for effecting the determination comprises means for transmitting a sequence of interrograting pulses of oscillations, the frequency of the oscillations being arranged to differ for different pulses in the sequence. A receiving station in the system has means for receiving and analysing the interrogating pulses, the said means including means for deriving a threshold signal dependent on the output of the receiving means during intervals free from interrogating pulses, indicating means, and clipping means for passing the output to said indicating means during respective subsequent intervals when interrogating pulses should be present. The clipping means is arranged to pass the output to the indicating means only to the extent that its amplitude exceeds the threshold signal and the indicating means is arranged to indicate the amplitude of pulses of oscillation of respective frequencies in the clipped output of the receiving means.

Figure 1:
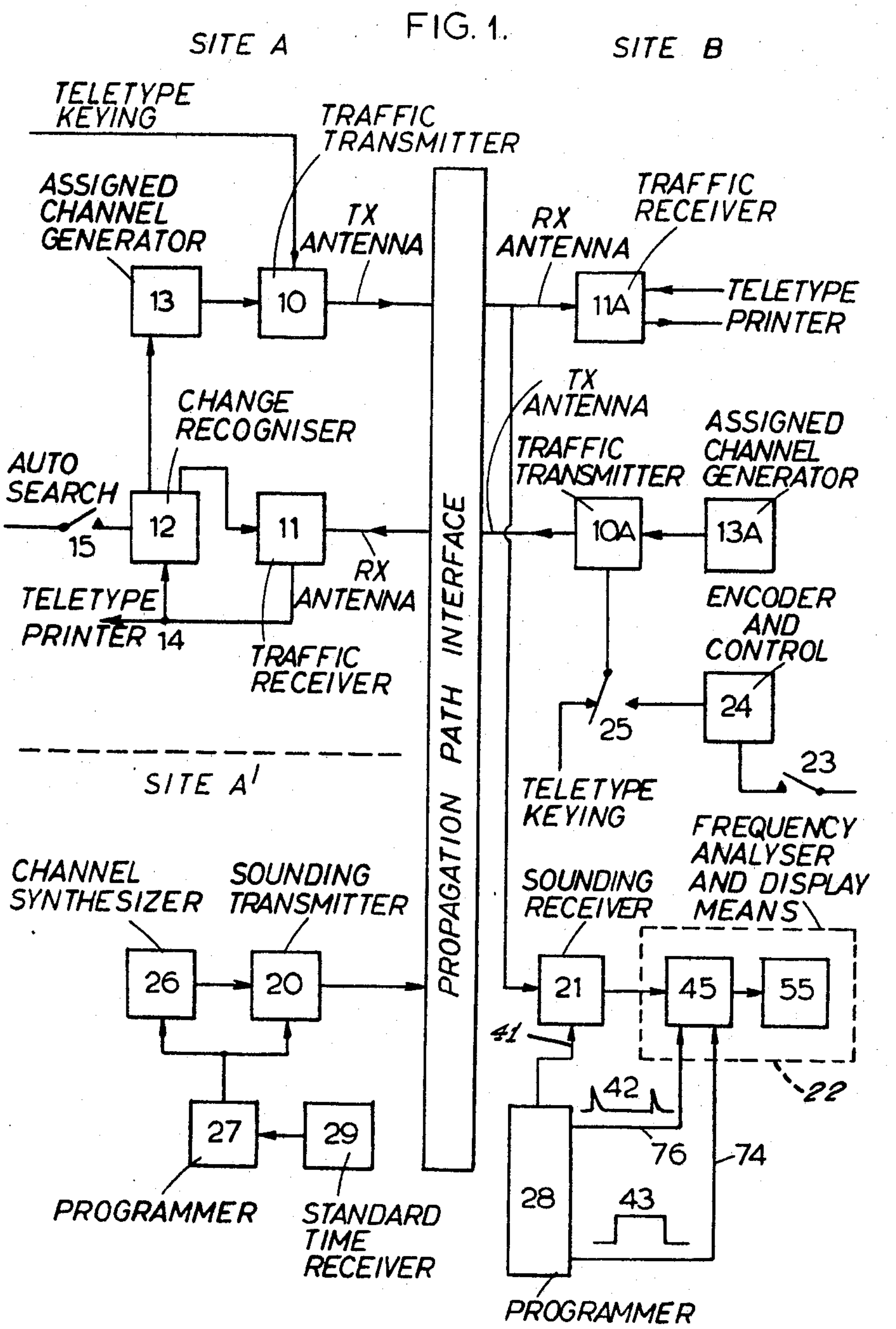

This invention relates to interrogating apparatus for determining the optimum carrier frequency for radio communication and relates especially but not exclusively to high frequency communication systems incorporating such apparatus for the selection of a frequency channel for the system giving the best communication conditions.

High frequency communication systems suffer from failure of the communication systems for a certain percentage of the total time. The failure here referred to is apparent failure of the ionospheric propagation path. Such failure may arise due to absorption and multi-path distortion by the ionized layers above the earth. To reduce such failure, communicators attempt to match the operating frequencies of communication systems to propagation conditions by shifting frequencies according to prediction charts prepared in advance. However such prediction charts are usually incomplete in that they give no detail of the lowest working frequency, multi-path conditions or anomalous propagation modes. This last omission is serious in areas where the predominant propagation mode is sporadic E. In addition the use of such charts is of little value in disturbed conditions.

One object of the present invention is to provide improved apparatus for determining the optimum carrier frequency for radio communication, which is useful for reducing the disadvantage indicated in the preceding paragraph.

Another object of the present invention is to provide improved predicting apparatus in which signals used for producing an indication of the optimum carrier frequency are rendered substantially free from noise and/or interference.

According to the present invention there is provided apparatus for determining the optimum carrier frequency for radio communication in a given frequency range, comprising means for transmitting a sequence of interrogating pulses of oscillation, means for causing the frequency of the oscillations to differ for different pulses in the sequence, means for receiving said pulses at a distant station, and means for analysing the received pulses of oscillation of different frequencies, said analysing means including means for deriving a threshold signal dependent on the level of the output of said receiving means during intervals free from interrogating pulses, indicating means, and clipping means for passing the output of said receiving means to said indicating means during respective subsequent intervals when interrogating pulses should be present, said clipping means passing said output to said indicating means only to the extent that it exceeds said threshold signal, and said indicating means indicating the amplitude of pulses of oscillation of the respective frequencies in the clipped output of said receiving means.

Preferably a peak detector is used for measuring the level of the output of the receiving means during said intervals free from sounding pulses, that is for measuring the level of noise and/or interference said threshold signal being derived in response to the output of the peak detector.

The invention is especially applicable to apparatus associated with a high frequency communication system in such a way as to constitute a self prediction system. A self prediction system in accordance with the invention comprises a communication system having a plurality of operating channels having suitable distributed frequency bands and means for switching to a particular channel which gives the best communication.

Figure 2:
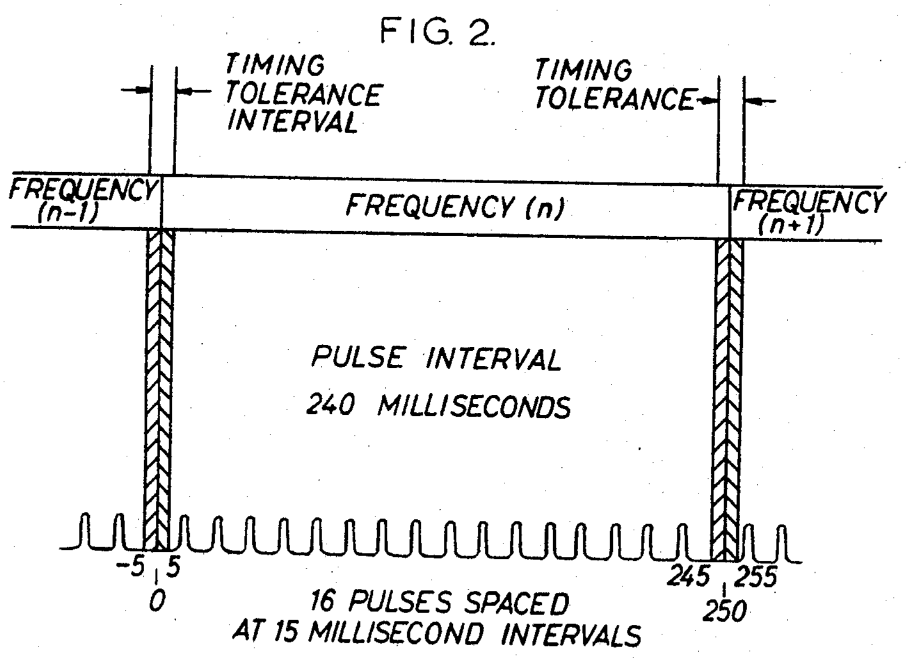
Figure 3:
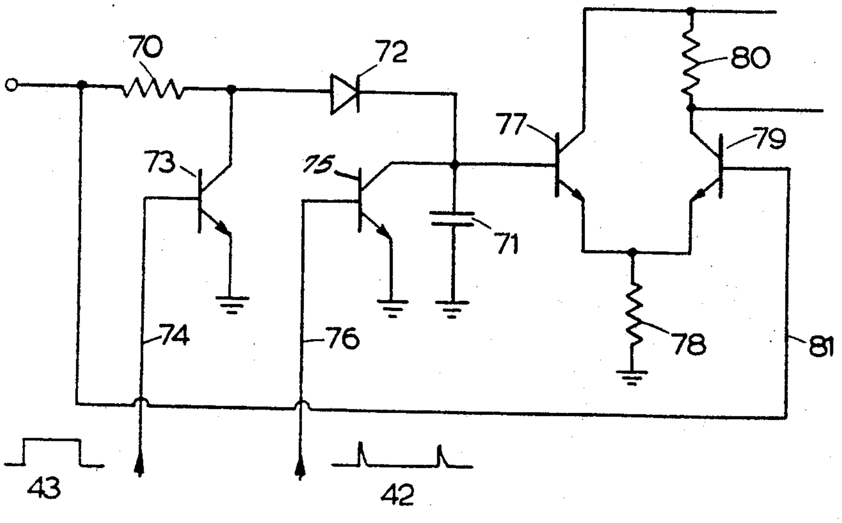
Figure 4:
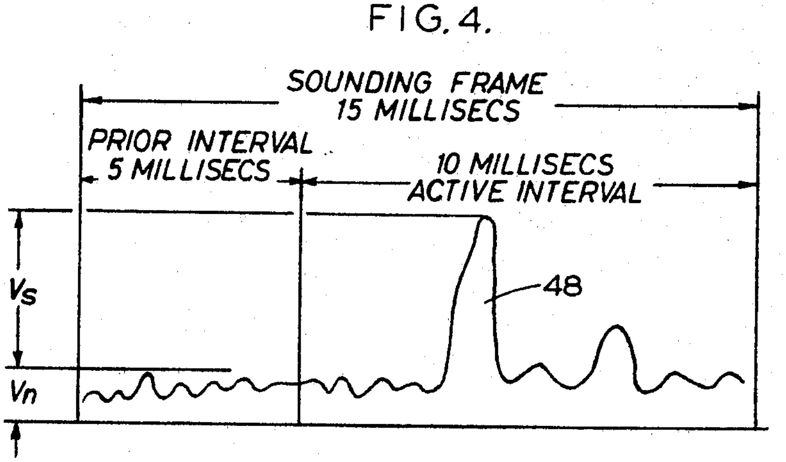

In order that the present invention may be clearly understood and readily carried into effect, it will now be more fully described with reference to the accompanying drawings, in which:

FIGURE 1 illustrates a self prediction communication system incorporating interrogating apparatus in accordance with one example of the invention, FIGURE 2 is a diagram illustrating sounding pulses emitted by interrogating apparatus such as illustrated in FIGURE 1, FIGURE 3 illustrates a circuit diagram of part of the frequency analysing and display means incorporated in the interrogating apparatus of FIGURE 1, FIGURE 4 is a waveform diagram which will be referred to in describing the operation of the interrogating apparatus illustrated in FIGURES 1 and 3.

In FIGURE 1 two stations of a communication system located respectively at sites A and B are represented, and interrogating apparatus is associated with the two stations. The communication equipment at site A comprises a traffic transmitter 10. It will be assumed that the signals to be transmitted are applied to the transmitter 10 in the form of teletype keying signals and that there are sixty four available channels in a four frequency octave band, typically from 2.375 to 38 mc./s., the frequency distribution of the channels being logarithmic. However, it will be understood that the invention is applicable to other systems. Equipment at site A further comprises a traffic receiver 11, and the receiver 11 is connected as shown to a circuit 12 which is a channel recognizer and control circuit. This circuit is responsive to appropriately coded signals from the receiver 11 and the output of the circuit 12 is applied to the receiver and to an assigned channel generator 13 as a result of which the transmitting and receiving frequencies of the site A equipment may be automatically changed to the best channel for communication in the conditions then prevailing. The output signals from the traffic receiver are also applied by a lead 14 to a teletype printer and the channel recognizer. Control circuit 12 can also be switched for automatic searching by a switch 15. The communication equipment at site B similarly comprises a transmitter 10A, a receiver 11A and an assigned channel generator 13A. It is to be understood that the term "channel" used in connection with this figure includes separate but closely spaced transmit and receive frequencies for a duplex circuit.

The interrogating apparatus associated with the communication equipment comprises an interrogating pulse transmitter, called herein a sounding transmitter 20 located at a site A'. The sites A and A' are located in the same general area but are indicated separately since the sounding transmitter facility may be required to provide a common facility for all local traffic sites. The signals from the transmitter 20 are propagated from a sounding antenna which may be separate from the antenna of the transmitter 10. At site B the interrogating pulse or sounding receiver 21 receives signals from the same antenna as the receiver 11A. The receiver 21 is a 64 channel receiver, and its output is fed to a frequency analyser and display means denoted generally by the dotted rectangle 22. Reference 23 denotes a switch whereby the operator at site B, depending on the display of the means 22, may select a different channel from the one which has been in use for communication. The representation 23 is intended to denote a plurality of switches whereby any one of a plurality of channels may be selected and an encoder and control circuit 24 is provided which responds to the particular switch which is closed by the operator to produce a signal which changes the frequency of the assigned channel generator 13A to the channel giving best communication at the respective time. The circuit 24 also operates a transmit switch 25 and transmits a coded signal corresponding to the selected channel for a period which may be between 10 and 30 seconds. When the switch is so operated, the transmitter 10A is disconnected from the teletype keying signals, as indicated on the drawing. It is the signal transmitted from 10A when the switch 25 is thus operated which is recognized by the change recognizer and control circuit at site A. The frequency of the oscillations transmitted by the sounding transmitter 20 is controlled by a channel synthesizer 26, and the synchronisation of the operation of the transmitter 20 and synthesizer 26 at site A and of the receiver 21, frequency analyser and synthesizer at site B is effected by a programmer and timing pulse generator 27 at site A and a programmer 28 at site B. The precise instant at which an interrogating sequence commences is determined by synchronizing the system against the signal from a standard time signal receiver 29.

The operation of the communication system illustrated in FIGURE 1 is such that periodically, say every 5, 15, 30 or 60 minutes depending upon the time of day or other factor, the sounding transmitter transmits a sequence of interrogating pulses of oscillations, the frequency of the oscillations sweeping once through the communication channel frequencies which number 64 in this example in a consecutive sequence of frequency steps on each frequency step a interrogating pulse or a train of interrogating pulses is radiated. FIGURE 2 illustrates a suitable pulse train which includes sixteen pulses spaced at 15 millisecond intervals, the pulse duration being from 50 to 250 microseconds. The number of pulses radiated on each frequency step may however differ from sixteen being say in the range from one to sixty-four. As aforesaid the precise instant at which the sweep commences is synchronized by the receiver 29. At the same intervals and in synchronism with the transmitter the sounding receiver at site B sweeps through the same band of channels. The sounding receiver is connected to the common receiver antenna of the communication system and detects the transmitted pulses if they pass through the propagation path. The output of the receiver during 64 consecutive time intervals will therefore correspond to signals received at each frequency. During the sweep period the frequency analyser and display means 22 examines each time interval for the appearance of pulses on the receiver output as will be explained subsequently in more detail, a pulse or pulses on each frequency step being for example displayed so that its characteristics may be observed. The station operator, depending upon the display, decides whether to change the system operating frequencies. If he decides to initiate a frequency change then he presses that one of the buttons represented collectively by 23 corresponding to the desired new channel frequency, at an appropriate time, and initiates the automatic change-over sequence from the encoder and control unit. The encoder and control unit 24 changes the frequency of the local receiver channel, operates transmit switch 25, and transmits the coded change signal corresponding to the new channel number.

At site A, this change signal is received and recognised in the change recognizer and control circuit, and this circuit then automatically changes the site A transmit and receive frequencies to the new channel. At site B, the encoder and control circuit 24, having completed its channel change instruction, releases transmit switch 25, and then changes its own traffic transmitter to the new channel, thus completing the change-over sequence.

It will, be realised from the foregoing description that the operator at the interrogating pulse receiving site has control of operating frequencies at both sites. To deal with the situation when communication does not exist betewen the sites, i.e. during and following a blackout, an automatic search feature is provided in the system. Thus, if no communication exists between sites A and B, then site B will continuously transmit the change instruction code corresponding to the latest determination and listen on the corresponding channel. At site A, the operator, having lost communication, closes switch 15 to put the system on "auto search" whereby his receiver will step through the assigned channels in a regular sequence until the change signal is received. At this point the search stops, and the site A operator transmits, on the now established channel, a message that communication is restored.

Referring now in greater detail to the construction of the frequency analysing and display means denoted in general by the dotted rectangle 22 in FIGURE 1, this means includes a noise clipper 45 and display means 55. The coupling from the programmer 28 to the receiver 21 whereby the receiver is switched at the appropriate times to the frequencies of the oscillation comprising successive interrogating pulses is denoted by the reference 41 and the programmer 28 is also arranged to generate two sequences of timing pulses, fragments of which are indicated by the references 42 and 43 in FIGURE 1 and which are respectively applied by the couplings 76 and 74 to the noise clipper 45. The output of the receiver 21 is applied to the noise clipper 45 and after clipping therein, in a manner which will become apparent, is applied to the display circuit 55.

FIGURE 4 shows a typical signal and noise waveform such as might be detected by the receiver 21 corresponding to a pulse frame in a interrogating sweep, the waveform comprising a pulse 48 corresponding to the respective interrogating pulse from the transmitter, the amplitude of which pulse may be in the range of from 0 to 10 volts. The waveform also comprises noise and possibly other interference, such as represented. Because of propagation time uncertainty and multi-path propagation modes, the pulse 48 may be received within a time interval of approximately 10 milliseconds, called the active interval, sufficient to accommodate the overall time tolerances. In an ideal noiseless environment therefore the received interrogating pulse will appear as a 50 to 250 microsecond pulse within the 10 millisecond active interval, and as a pulse frame lasts for 15 milliseconds in this example of the invention, an interval of 5 milliseconds can be defined before the active interval of each frame when noise and interference only will be received. This 5 millisecond interval is called the prior interval. These two intervals are denoted in FIGURE 4, and having regard to those intervals the pulses 42 generated by the programmer 28 are short pulses one of which occurs at the beginning of the prior interval of each pulse frame. Furthermore the pulses 43 are long pulses lasting for the 10 millisecond duration of the active signal of the interrogating pulse frame.

As illustrated in FIGURE 3 the noise clipper 45 comprises a peak rectifying circuit including a resistor 70 a diode 72 and a capacitor 71. The junction of 70 and 72 is connected to the collector of a transistor 73 the emitter of which is grounded and the base of which is connected by lead 74 to the programmer 28 to receive the pulses 43. The junction of 71 and 72 is connected to the collector of another transistor 75, of which the emitter is grounded and the base connected by lead 76 to the programmer 28 to receive the pulses 42. Moreover the junction of 71 and 72 is connected to the base of a transistor 77 which has an emitter resistor 78 in common with another transistor 79, the transistors 77 and 79 constituting a differencing circuit. The transistor 79 has a collector lead resistor 80, the voltage generated across which, suitably amplified, forms the input signal for the circuit 55. The detected output of the receiver 21 is applied to the resistor 70 and via lead 81 to the base of the transistor 79. The detector output is unidirectional in the positive direction and in the range 0 to 10 volts.

In operation of the arrangement, a pulse 42 momentarily switches on the transistor 75 at the beginning of each prior interval of a pulse frame and discharges the capacitor 71 closely to ground potential. Thereupon during the prior interval, the transistor 73 being in high impedance state, capacitor 71 charges via the diode 72 to the peak level of such noise and interference signals which may occur, this level being denoted by $V_n$ in FIGURE 4. Thereafter during the active interval transistor 73 is switched on and maintained on by pulse 43, grounding the junction of resistor 70 and diode 72, so that diode is rendered non-conducting, and isolates the capacitor 71. The peak level of noise and/or interference detected during the prior interval is therefore applied as a threshold signal to the base of the transistor 77 during the active interval. If, during this active interval, an interrogating pulse is received by the receiver 21 and applied to the base electrode of the transistor 79, that transistor will conduct only if the pulse amplitude closely approaches and exceeds the threshold represented by the signal applied to the base of the transistor 77. There is therefore obtained from the collector of the transistor 79 the desired clipped signal $V_S$ shown in FIGURE 4 which is applied to the display circuit 55. This circuit may be of any suitable kind but in the present example of the invention is an analogue display circuit producing a display on a cathode ray oscilloscope of the kind known as a "B" display, suitable provision being made to indicate in each case the respective pulse oscillation frequency. It will thus be appreciated that the noise clipper 45 takes advantage of the prior interval of the interrogating frame to obtain a significant measure of the level of the noise and interference, and depending upon this measure "cleans" the pulses in the output of the receiver before passing them to the display circuit 55. An output signal is obtained from the noise clipper 45 only when a pulse is received during an active interval of any interrogating pulse frame exceeding in amplitude the level of noise and interference during the noise interval of that frame. Assessments to be made by the observer are thus facilitated.

It is to be understood that the frequency analysing and display means may also have provision for measuring and displaying other characteristics of received signals.

The invention is not confined in its application to the type of communication system which is described with reference to FIGURE 1, for example it may be applied to point-mobile systems with appropriate modification in detail. Moreover, the components of the arrangement illustrated, the constructions of which have not been specifically described, may be conventional.

What I claim is:

1. Apparatus for determining the optimum carrier frequency for radio communication in a given frequency range, comprising means for transmitting a sequence of interrogating pulses of oscillation, means for causing the frequency of the oscillations to differ for different pulses in the sequence, means for receiving said pulses at a distant station, and means for analysing the received pulses of oscillation of different frequencies, said analysing means including means for deriving a threshold signal dependent on the level of the output of said receiving means during intervals free from interrogating pulses, indicating means, and clipping means for passing the output of said receiving means to said indicating means during respective subsequent intervals when interrogating pulses should be present, said clipping means receiving said threshold signal and passing said output to said indicating means, only to the extent that it exceeds said threshold signal, and said indicating means indicating the amplitude of pulses of oscillation of the respective frequencies in the clipped output of said receiving means.

2. Apparatus according to claim 1 wherein said means for deriving said threshold signal comprises means for measuring the peak level of the output of said receiving means during said intervals free from interrogating pulses.

3. Apparatus according to claim 1 in which said indicating means comprises a signal analogue display means.

4. Apparatus according to claim 1 comprising means for transmitting said sequence of interrogating pulses at periodic intervals.

5. Apparatus according to claim 1 incorporating in a radio communication system and including means for changing the frequency of the communication channel in dependence upon switch means operable by an operator observing said indicating means.

6. Radio receiving apparatus intended for use in determining the optimum carrier frequency for radio communication within a range of frequencies, comprising means for receiving a sequence of interrogating pulses of oscillation, the reception frequency of said means being systematically variable to allow for the frequency of the oscillation being different for different pulses in the sequence, and means for analysing the received pulses of oscillation of different frequencies, said analysing means including means for deriving a threshold signal dependent on the level of the output of said receiving means during intervals free from interrogating pulses, indicating means, and clipping means for passing the output of said receiving means to said indicating means during respective subsequent intervals when interrogating pulses should be present, said clipping means receiving said threshold signal and passing said output to said indicating means only to the extent that it exceeds said threshold signal, and said indicating means indicating the amplitude of pulses of oscillation of the respective frequencies in the clipped output of said receiving means.

7. Apparatus according to claim 6 wherein said means for deriving said threshold signal comprises means for measuring the peak level of the output of said receiving means during said intervals free from interrogating pulses.

8. Apparatus according to claim 7 in which said clipping means comprises means for subtracting said threshold signal from the output of said receiving means during said subsequent intervals when sounding pulses should be present.

References Cited

UNITED STATES PATENTS

| | | | |
|---|---|---|---|
| 2,446,244 | 8/1948 | Richmond | 343—13 |
| 2,521,696 | 9/1950 | De Armond | 325—51 |
| 2,958,767 | 11/1960 | Labin et al. | 343—179 |

ROBERT L. GRIFFIN, Primary Examiner

BENEDICT V. SAFOUREK, Assistant Examiner

U.S. Cl. X.R.

325—56, 322, 323